United States Patent [19]

Ishihara et al.

[11] Patent Number: 5,086,221
[45] Date of Patent: Feb. 4, 1992

[54] ROTARY ENCODER HAVING STATIONARY CENTRAL SUPPORT SHAFT

[75] Inventors: Yukihiro Ishihara, Kaizuka; Tamotsu Yamamoto, Ashiya; Hiroshi Matsui, Hirakata, all of Japan

[73] Assignee: Matsushita Electric Industrial Co., Ltd., Osaka, Japan

[21] Appl. No.: 499,437

[22] PCT Filed: Oct. 25, 1989

[86] PCT No.: PCT/JP89/01093
§ 371 Date: Jun. 21, 1990
§ 102(e) Date: Jun. 21, 1990

[87] PCT Pub. No.: WO90/04755
PCT Pub. Date: May 3, 1990

[30] Foreign Application Priority Data

Oct. 25, 1988 [JP] Japan .................. 63-268462
Oct. 25, 1988 [JP] Japan .................. 63-268464

[51] Int. Cl.$^5$ ................................ G01D 5/30
[52] U.S. Cl. ................... 250/231.13; 341/13
[58] Field of Search ........... 250/237 G, 239, 231.13, 250/231.14, 231.16, 231.17, 231.18; 341/13, 16

[56] References Cited

U.S. PATENT DOCUMENTS 4,406,946 9/1983 Osanai .................. 250/231.14
4,599,605 7/1986 Froeb et al. ............ 341/16

FOREIGN PATENT DOCUMENTS 60-113109 6/1985 Japan .
WO/9004756 3/1990 PCT Int'l Appl. .

OTHER PUBLICATIONS

Roberts, Steven K., "Reliable Sensing with Optoelectronics", Cleveland US 50(1): 104-109, Jan. 1978.

Primary Examiner—David C. Nelms
Assistant Examiner—K. Shami
Attorney, Agent, or Firm—Panitch Schwarze Jacobs & Nadel

[57] ABSTRACT

The objective of this invention is to provide a compact rotary encoder with no axial play, and in order to achieve this objective, the cylindrical operating shaft is supported by the cylindrical support shaft extending up from the bottom surface of the rotary encoder base member so that the attachment portion of the control knob and the fitting portion of the cylindrical operating shaft can be made longer, whereby inclination in the control knob and play in the fitting portion of the operating shaft can be reduced while keeping the overall height of the rotary encoder small.

7 Claims, 10 Drawing Sheets

ROTARY ENCODER HAVING STATIONARY CENTRAL SUPPORT SHAFT

TECHNICAL FIELD

This invention relates to a rotary encoder which is used mainly for editing in video equipment and tuning in radios and generates pulse signals by being rotated.

BACKGROUND ART

FIGS. 10 through 13 show a rotary encoder of the prior art. FIGS. 10 and 11 show a single-shaft type rotary encoder, where FIG. 10 is a sectional side view and FIG. 11 is a plan view of a circular comb-shaped contact. In FIGS. 10 and 11, reference numeral 1 denotes a base member made from die cast zinc or other material. On the center of the upper surface of the base member, there is provided is a cylindrical bearing 2 in which the operating shaft 3 is fitted and supported rotatably and on which a screw thread 2' for attachment to a device is provided. The operating shaft 3 comprises a fitting portion 3' and an attachment portion 3" above the fitting portion 3' for attachment to a control knob 4. At the lower end of the operating shaft 3, a rotary contact plate 6 made from an insulating resin and having a circular comb-shaped movable contact 5 on its lower surface is supported. A fixed contact substrate 8 made from an insulating resin is attached to the lower end of a cylindrical wall 7 extending down from the outer circumference of the base member 1, and contact portions of flexible fixed contacts 9 protruding up from the fixed contact substrate 8 are in flexible contact with the circular comb-shaped movable contact 5 on the above-mentioned rotary contact plate 6.

Therefore, by rotating the operating shaft 3 via the control knob 4, a pulse signal is generated between the circular comb-shaped movable contact 5 and the flexible fixed contacts 9 and output to an external connection terminal 10 with which the fixed contacts 9 have continuity.

The rotary encoder of this type is usually provided with a control knob having a wide diameter on the operating shaft to facilitate fast rotation, but in order for the control knob to turn smoothly, the knob must be attached to the operating shaft without inclination and there must be as little play as possible in the fitting portion of the operating shaft and the shaft supporting portion. In order to minimize any inclination in the attachment portion of the control knob and play in the fitting portion of the operating shaft, the attachment portion and the fitting portion must be made as long as possible.

However, in the configuration of the abovementioned conventional rotary encoder, the length A of the attachment portion of the control knob 4 to the operating shaft 3, and the length B of the fitting portion of the operating shaft 3 to the bearing 2 both extend above the height C of the rotary encoder base member 1. Therefore, to make the lengths A and B longer means to make the overall height (A+B+C) of the rotary encoder longer.

FIGS. 12 and 13 show a double-shaft rotary encoder wherein the outer shaft generates a speed mode switching signal for fast forwarding a video tape and the inner shaft generates a pulse signal for frame advance of a video tape. FIG. 12 is a sectional side view of the double-shaft rotary encoder and FIG. 13 is a plan view of a fixed contacts of the same.

In FIGS. 11 and 12, reference numeral 21 denotes a base member made from die cast zinc or other material. On the center of the upper surface of the base member, there provided is a cylindrical bearing 22 in which an outer operating shaft 23 is fitted and supported rotatably and on which a screw thread 22' for attachment to a device is provided. The outer operating shaft 23 is made from an insulating resin and comprises a cylindrical fitting portion 23' and an attachment portion 23" extending above the fitting portion for attachment to a control knob, and at the lower end of the outer shaft 23, an outer contact substrate 26 supporting outer rotary flexible contacts 25 is formed into a single unit with the outer operating shaft 23. An inner operating shaft 27 supported in the center hole of the outer operating shaft 23 so that it can independently rotate comprises an attachment portion 27' on its extended portion for attachment to an inner control knob 28. Also, at the lower end of the inner operating shaft 27, an inner contact substrate 30 which is made from an insulating material and supports inner rotary flexible contacts 29 is attached so that it rotates together with the inner operating shaft 27 and is positioned vertically by two washers 31 and 32.

A contact substrate 36 made from an insulating material and having a plurality of concentric fixed contacts 34 and 34', and 35 and 35' on its upper surface is attached to the lower end of a cylindrical wall 33 extending down from the outer circumference of the base member 21. The outer rotary flexible contacts 25 protruding from the outer contact substrate 26 and the inner rotary flexible contacts 29 protruding from the inner contact substrate 30 are in contact with the fixed contacts 34 and 34', and 35 and 35', respectively. In FIG. 13, the hatched portions denote the fixed contacts 34 and 34', and 35 and 35' exposed on the surface, and the solid portions denote leads to the terminals covered by an insulating film. When the outer operating shaft 33 is turned by the outer control knob 24, a speed mode switching signal for fast forwarding of the video tape is generated between the outer rotary flexible contacts 25 and the fixed contacts 34 and 34'. Likewise, when the inner operating shaft 27 is turned by the inner control knob 28, a pulse signal is generated between the inner rotary flexible contacts 29 and the fixed contacts 35 and 35', which in turn generates a signal for frame advance of the video tape. These signals are output from the terminals 37 and 38 connected to the respective fixed contacts.

However, in the single-shaft rotary encoder shown in FIGS. 10 and 11, it is difficult to decrease the overall height of the rotary encoder as mentioned above, and rotary encoders with this conventional configuration are not suited to current compact, high-performance devices.

In addition to the problems of the single-shaft rotary encoder above, in the double-shaft rotary encoder shown in FIGS. 12 and 13, the cylindrical outer operating shaft 23 is supported by the cylindrical bearing 22 on the upper surface of the base member 21 and the inner operating shaft 27 is supported within the center hole of the outer operating shaft 23, so that the frequently used inner operating shaft 27 has a large amount of play in the radial direction (radial play) due to the gaps both between the bearing 22 and the outer operating shaft 23, and between the outer operating shaft 23 and the inner operating shaft 27. Also, when the above two gaps are made small so as to reduce radial play, other problems are caused such that the rotating torque may increase, and the outer operating shaft 23 and inner operating shaft 27 may rotate together.

DISCLOSURE OF THE INVENTION

The present invention overcomes the above-mentioned problems and aims at providing a rotary encoder which is compact and has no axial play. In order to achieve this objective, the cylindrical operating shaft is supported by a cylindrical support shaft extending from the bottom surface of the base member of the rotary encoder, whereby the overall height of the rotary encoder is kept small and the control knob attachment portion and operating shaft fitting portion are made longer. By supporting the cylindrical operating shaft by the cylindrical support shaft extending from the bottom surface of the base member of the rotary encoder, the attachment portion of the control knob and the fitting portion of the cylindrical operating shaft can be made longer, whereby inclination in the control knob and play in the operating shaft fitting portion can be minimized while keeping the overall height of the rotary encoder small.

BEST MODE FOR CARRYING OUT THE INVENTION

(EXAMPLE 1)

Figure 1:
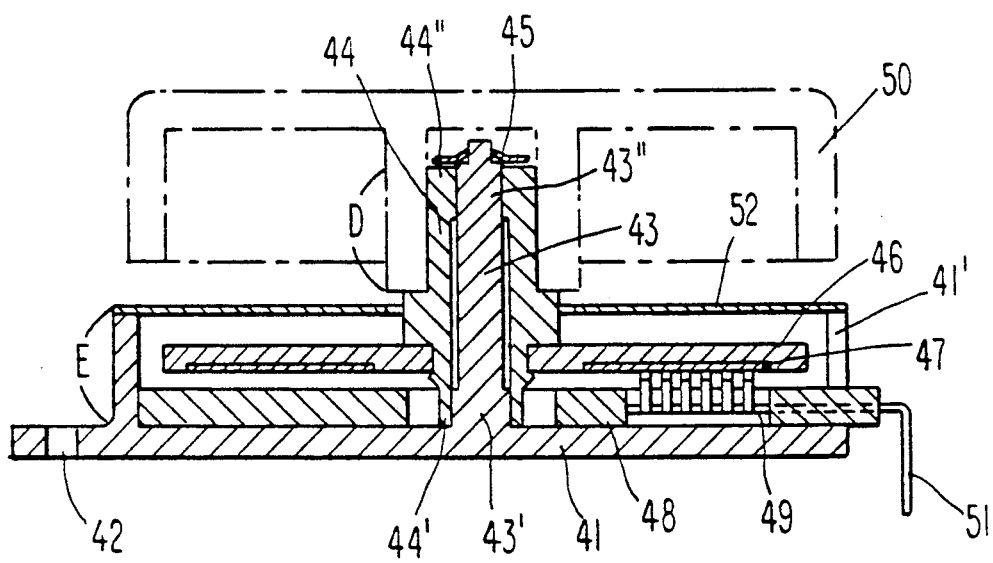
FIG. 1 is a sectional side view showing a rotary encoder of the present invention.
Figure 2:
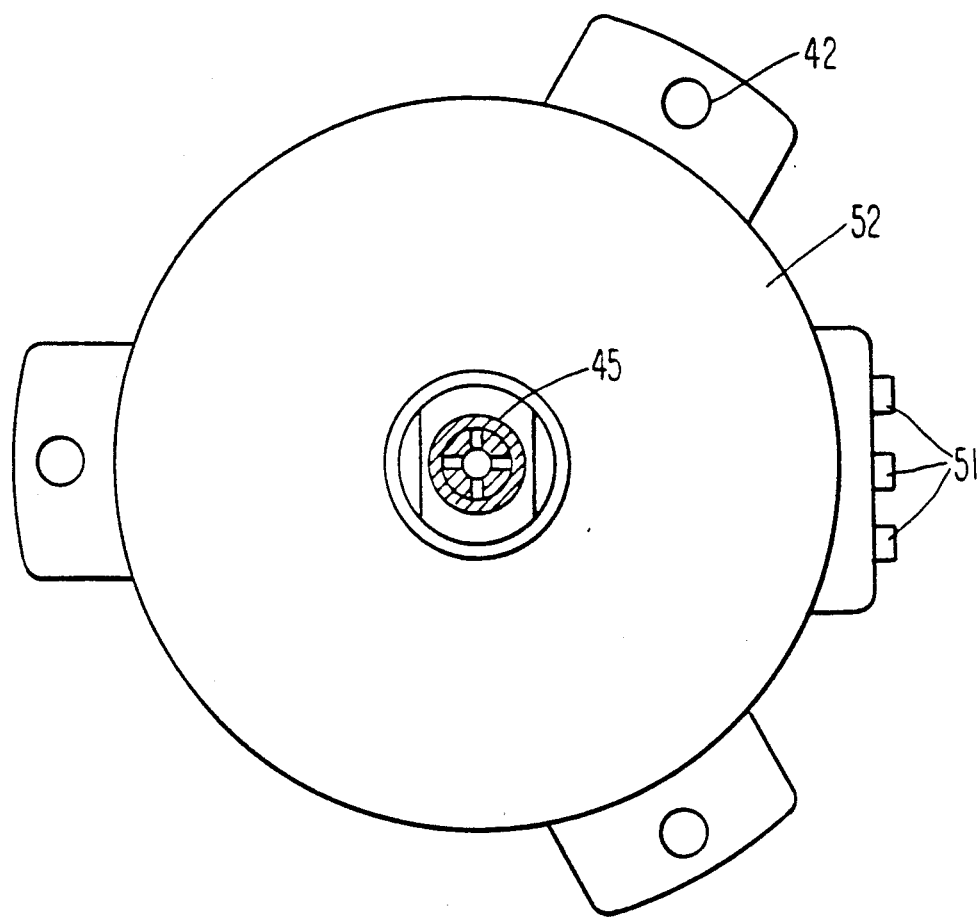
FIG. 2 is a plan view of the same.

FIG. 1 is a sectional view showing a single-shaft rotary encoder of the first embodiment of this invention, and FIG. 2 is a plan view showing the rotary encoder in FIG. 1. In FIGS. 1 and 2, reference numeral 41 is a base member made from die cast zinc or other material, and it has attachment holes 42 for attachment to a device on its outer flange and a cylindrical support shaft 43 extending perpendicularly up from the center of its circular bottom surface. The cylindrical support shaft 43 has a slightly larger diameter at its bottom portion 43' and has a smaller diameter at the top portion 43" in order to minimize the increase in rotational torque in the fitting portion. Each diameter is supported to permit rotation by a large inner diameter 44' at the lower end and a small inner diameter 44" at the upper end of a cylindrical operating shaft 44, and the cylindrical support shaft 43 is held in place by a washer 45 on the top end thereof. A rotary contact plate 46 made from an insulating resin is attached to the outside and near the lower end of the cylindrical operating shaft 44, and a circular comb-shaped movable contact 47 is disposed on the lower surface of the rotary contact plate 46. The contact portions of the flexible fixed contacts 49 which are lead from the flexible metal plate formed inside a fixed contact plate 48 that is made from an insulating resin and positioned on the bottom of the base member 41 are in flexible contact with the circular comb-shaped movable contact 47 on the rotary contact plate 46. A rotary control knob 50 is attached to the outside of the cylindrical operating shaft 44 protruding above the outer wall 41' of the base member 41, and when the rotary control knob 50 is turned, the rotary contact plate 46 is caused to turn via the cylindrical operating shaft 44. This, in turn, causes the contacts of the flexible fixed contacts 49 to slide on the circular comb-shaped movable contact 47 on the surface of the rotary contact plate 46 and lose contact with the conductive portion of the circular comb-shaped movable contact 47, whereby a pulse signal is generated and output from external connection terminals 51 with which each of a plurality of the flexible contact portions of the flexible fixed contacts 49 have continuity.

Here, reference numeral 52 denotes a cover plate to keep out dust.

In the above first embodiment, the cylindrical support shaft 43 extending up from the center of the disc-shaped bottom surface of the base member 41 supports the cylindrical operating shaft 44 at the bottom portion and at the top portion in order to avoid the increase in rotational torque in the fitting portion, but the purpose of the invention can still be achieved by supporting it over the entire length of the shafts 43 and 44.

Further, in this embodiment, attachment holes 42 in the outer flange of the base member 41 were used as the means for attaching the rotary encoder to a device, but the same can be achieved by providing attachment screw holes in the bottom surface of the base member 41.

Also in this embodiment, a circular comb-shaped movable contact 47 was disposed on the rotary contact plate 46 attached to the cylindrical operating shaft 44, and flexible fixed contacts 49 were disposed on the fixed contact plate 48 on the bottom surface of the base member 41, but the same effect can be achieved by reversing the positions of these contacts; i.e., flexible contacts on the rotary contact plate 46 and circular comb-shaped movable contact on the fixed contact plate 48.

In FIG. 1, assuming the attachment length of the control knob 50 and the cylindrical operating shaft 44 is D and the height of the outer wall 41' of the rotary encoder base member 41 is E, the fitting length of the cylindrical operating shaft 44 and the cylindrical support shaft 43 is (D+E), which is much longer than the fitting length B in the prior art configuration.

Figure 10:
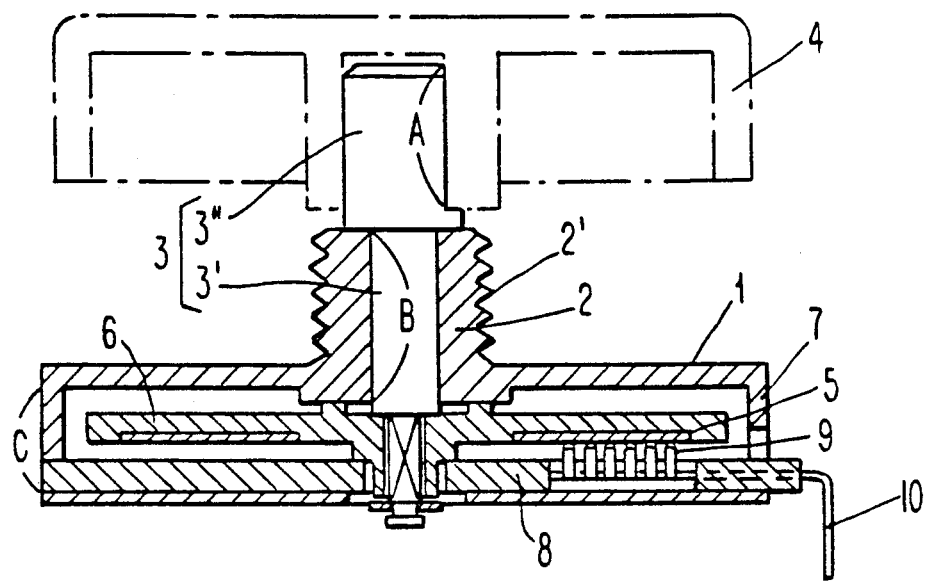
FIG. 10 is a sectional side view showing a conventional rotary encoder.
Figure 11:
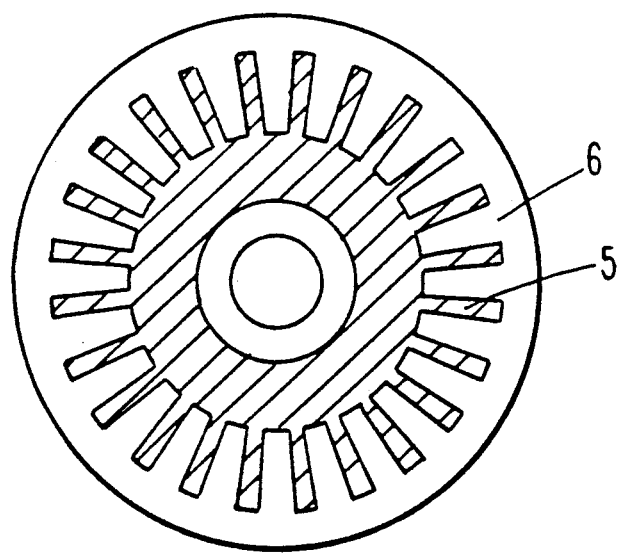
FIG. 11 is a plan view showing a circular comb-shaped contact of the same.
Figure 12:
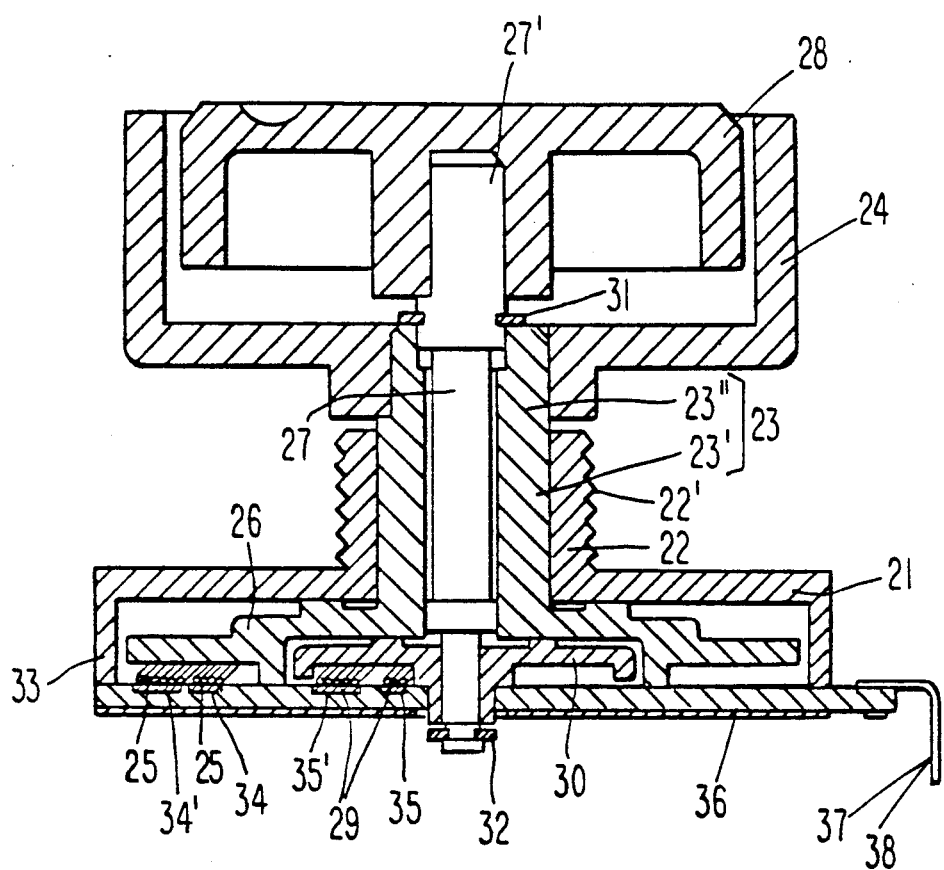
FIG. 12 is a sectional side view showing a conventional double-shaft rotary encoder.
Figure 13:
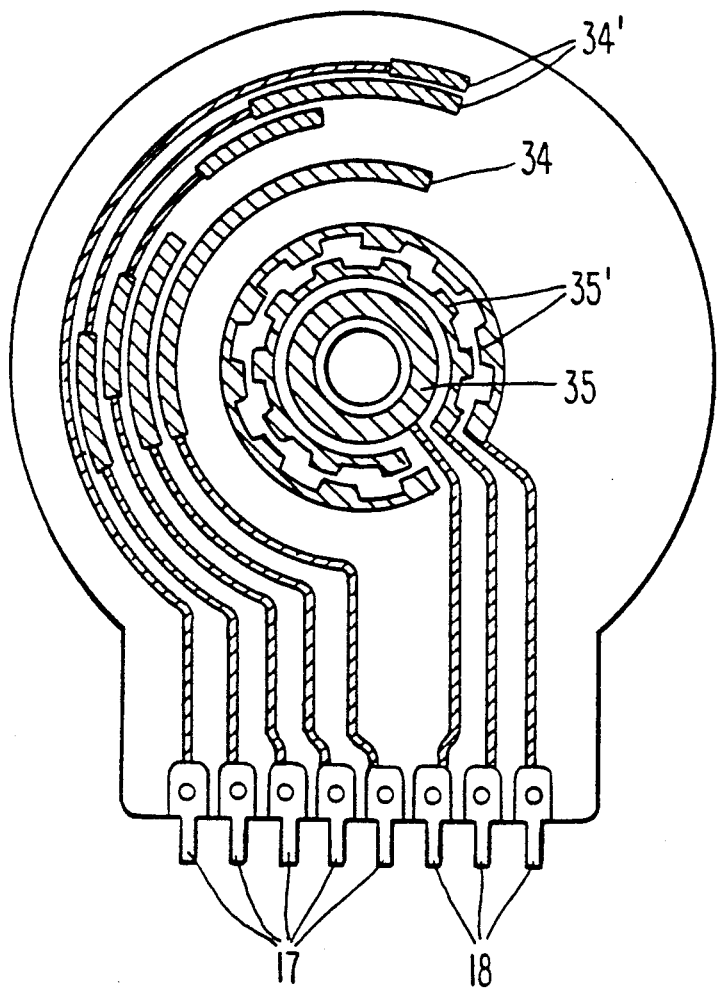
FIG. 13 is a plan view showing fixed contacts of the same.

Compared to the prior art configuration in FIG. 10, assuming $A \approx D$ and $C = E$, the overall height of the rotary encoder becomes $D + E \approx A + C$, thus making it shorter (lower profile) by length B compared to the height $A + B + C$ of the prior art configuration.

(EXAMPLE 2)

Figure 3:
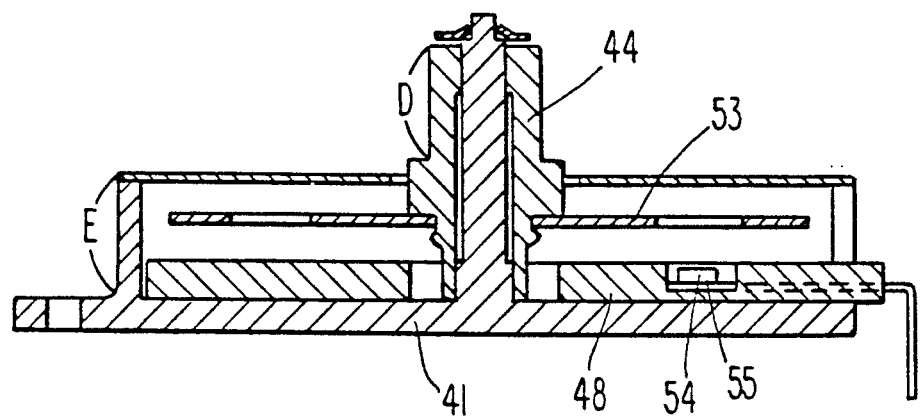
FIG. 3 is a sectional side view of an optical rotary encoder of the present invention.
Figure 4:
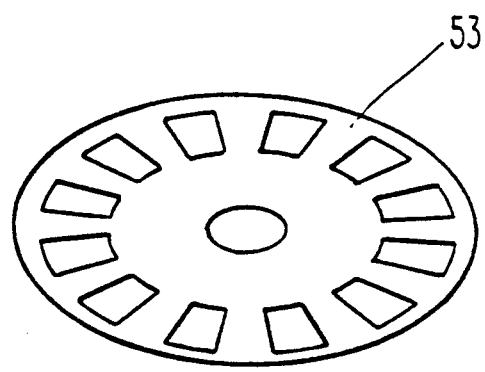
FIG. 4 is a perspective view of a circular reflective slit plate of the optical rotary encoder in FIG. 3.

FIGS. 3 and 4 show the second embodiment of this invention, the first of which is a sectional side view of a single-shaft optical rotary encoder. It is explained below using the same numbers for the principle parts as in the first embodiment. This is an optical rotary encoder comprising a circular reflective slit plate 53 attached near the lower end of the cylindrical operating shaft 44 and a light emitting element (LED) 54 and light receiving element (phototransistor) 55 mounted on the fixed contact plate 48 made from an insulating resin on the bottom surface of the base member 41, and as in the first embodiment, it is shorter (lower profile) by length B than the height A+B+C of the prior art configuration.

(EXAMPLE 3)

Figure 5:
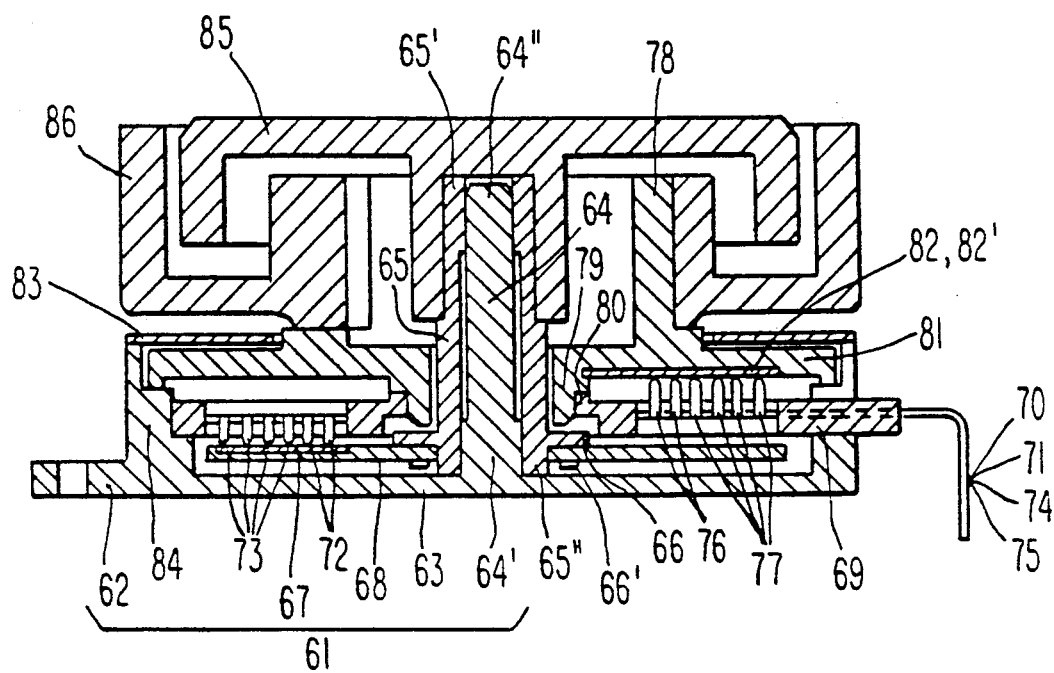
FIG. 5 is a sectional side view of a double-shaft rotary encoder of the present invention.
Figure 6:
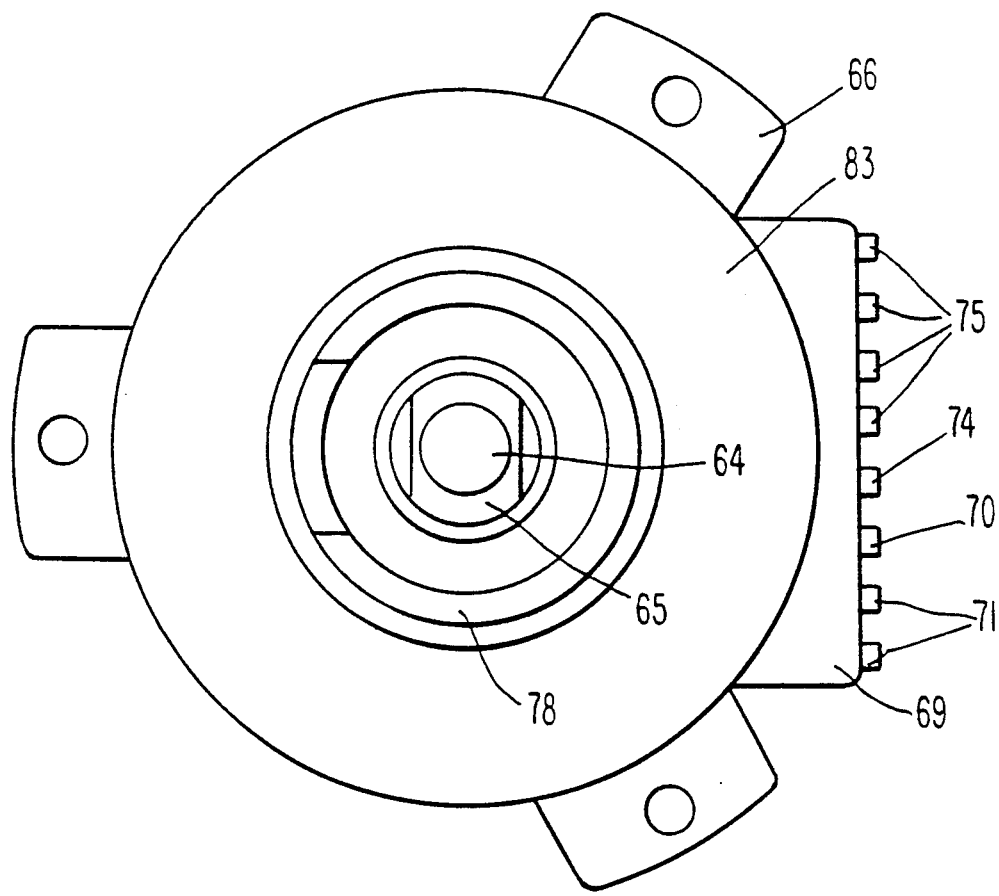
FIG. 6 is a plan view of the same without control knobs attached.
Figure 7:
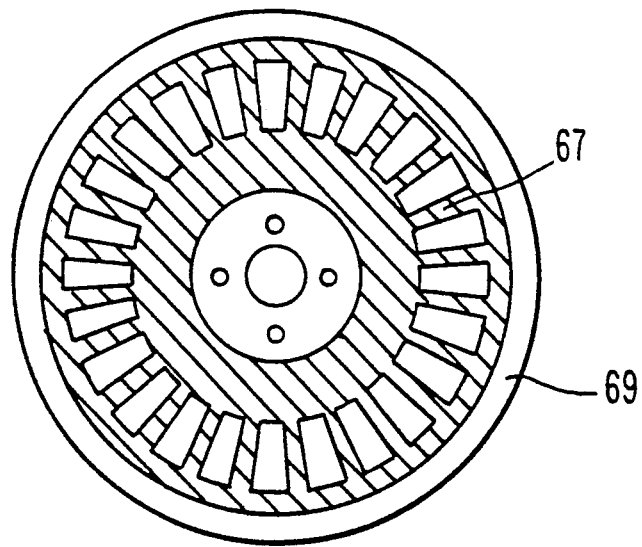
FIG. 7 is a plan view showing a radial rotary contacts of the inner operating shaft of the same.
Figure 8:
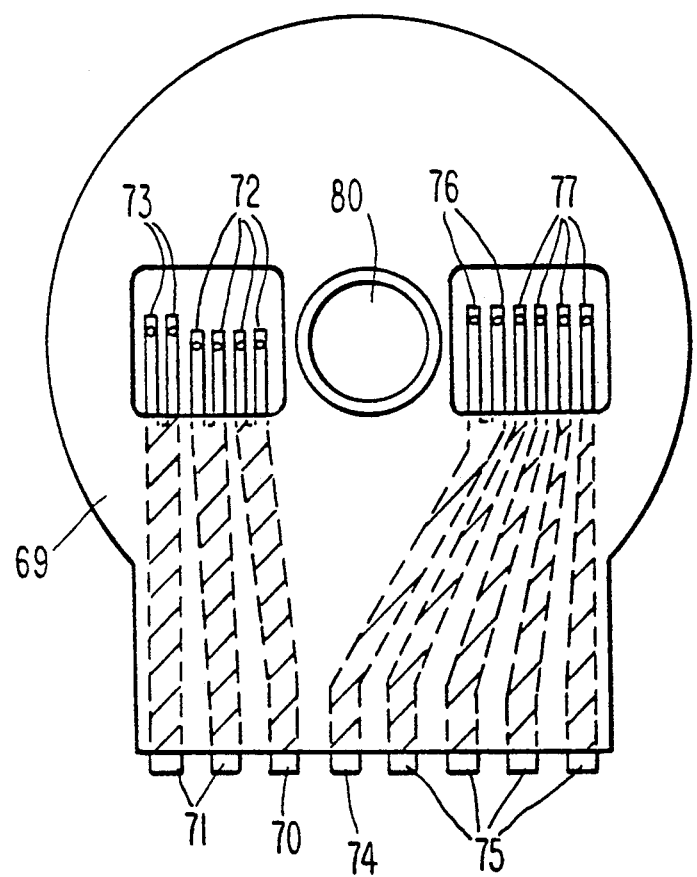
FIG. 8 is a plan view showing a fixed contact substrate of the same.
Figure 9:
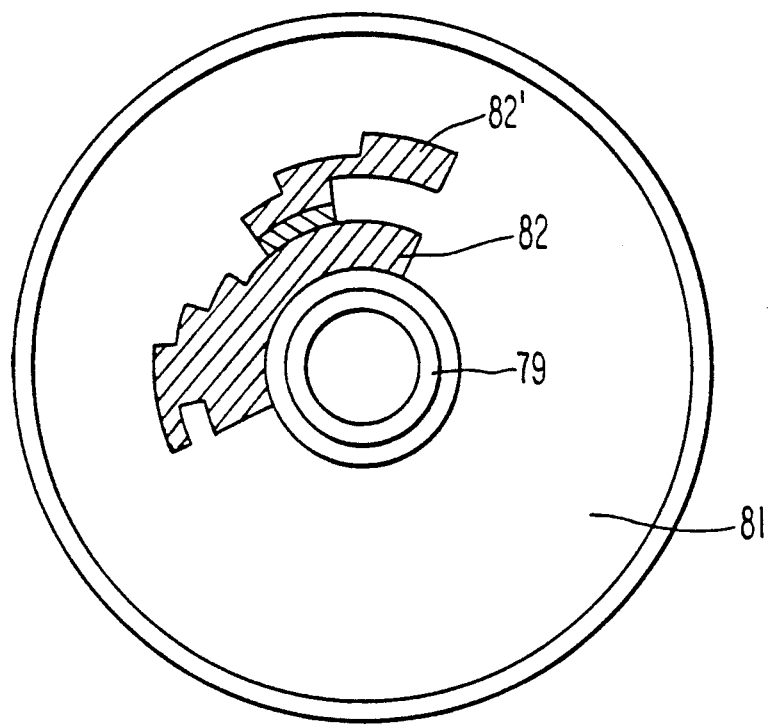
FIG. 9 is a plan view showing a rotary contact plate of an outer operating shaft of the same.

FIGS. 5 through 9 show a double-shaft rotary encoder which is the third embodiment of this invention. FIG. 5 is a sectional side view of the rotary encoder, FIG. 6 is a plan view of the same without an outer and inner control knobs attached, FIG. 7 is a plan view of radial rotary contacts of an inner shaft of the same, FIG. 8 is a plan view of a fixed contact substrate of the same, and FIG. 9 is a plan view looking up from the bottom of a rotary contact plate of an outer shaft of the same.

In the drawings, reference numeral 61 denotes a base member made from die cast zinc or other material which has attachment portions 62 on its outer circumference for attachment to a device and a cylindrical support shaft 64 extending perpendicularly up from the center of a disc-shaped bottom 63. This cylindrical support shaft 64 supports a small cylindrical inner operating shaft 65 so that the shaft 65 can rotate, but in order to minimize the increase in rotational torque in the fitting portion, the cylindrical support shaft 64 has a slightly larger diameter at the bottom portion 64' and a smaller diameter at the top portion 64" and the small cylindrical inner operating shaft 65 has a slightly smaller inner diameter at the top portion 65' and a larger diameter down at the bottom portion 65" so that the top portions of the shafts 64 and 65 and the bottom portions of the shafts 64 and 65 fit, respectively. The narrow gap between the top portions and the bottom portions serves as a holding space for grease.

An inner rotary contact plate 68 made from an insulating material and having radial inner rotary contacts 67 on its upper surface is attached to a flange 66 in the vicinity of the outside lower end of the small cylindrical inner operating shaft 65 by means of dowels 66' so that the contact plate 68 and shaft 65 turn together.

The reference numeral 69 denotes a fixed contact substrate made from a molding resin which is supported at its outer circumference by a cylindrical outer wall 84 of the base member 61. The fixed contact substrate 69 is molded with a thin flexible metal plate in it, and lower surface flexible contacts 72 and 73 having continuity with external output terminals 70 and 71 and upper surface flexible contacts 76 and 77 having continuity with external output terminals 74 and 75 protrude down and up from the lower and upper surfaces.

The lower surface flexible contacts 72 and 73 contact the radial inner rotary contacts 67 on the inner rotary contact plate 68 and generate a pulse signal between the terminals 70 and 71.

A large cylindrical outer operating shaft 78 made from a molding resin and positioned concentrically on the outside of the small cylindrical inner operating shaft 65 is rotatably supported at its lower cylindrical portion 79 by the center round hole 80 in the fixed contact substrate 69, but there is a fixed gap between the lower cylindrical portion 79 and the inner operating shaft 65 so that they do not come in contact and turn together.

Also, a disc-shaped outer rotary contact plate 81 is formed in a single unit with the outer operating shaft 78 around its lower end, the outer rotary contact plate 81 being provided with outer rotary contacts 82 and 82' on its lower surface. These outer rotary contacts 82 and 82' come in contact with the upper surface flexible contacts 76 and 77 protruding up from the fixed contact substrate 69 and generate a switching signal between the terminals 74 and 75.

The reference numeral 83 denotes a metal cover which is secured to the base member 61 by pawls (not shown) on the outer circumference, and the flat part of the cover holds down the upper surface of the disc-shaped rotary contact plate 81 at the lower end of the large cylindrical outer operating shaft 78 so that the outer operating shaft 78 does not rise up.

Further, when the inner operating shaft 65 is pulled up, the flange 66 of the inner operating shaft 65 is stopped by the bottom edge of the lower cylindrical portion 79 of the outer operating shaft 78, thus limiting the upward movement of the inner operating shaft 65.

In the above configuration of this invention, the inner control knob 85 and the outer control knob 86 are attached to the small cylindrical inner operating shaft 65 and the large cylindrical outer operating shaft 78, respectively. When the outer operating shaft 78 is rotated by turning the outer control knob 86, a switching signal for the video tape fast forwarding mode is generated between the outer rotary contacts 82 and 82' and the fixed flexible contacts 76 and 77 and output between the terminals 74 and 75. Also, when the inner operating shaft 64 is rotated by turning the inner control knob 85, a pulse signal is generated between the inner rotary contacts 67 and the fixed flexible contacts 72 and 73 and output as a video frame advance signal between the terminals 70 and 71.

In the above embodiment, the fixed contacts 76 and 77, and 72 and 73 on the upper and lower surfaces of the fixed contact substrate 69 were flexible contacts, and the rotary contacts 82 and 82', and 67 with which these fixed contacts came in contact were flat sliding contacts, but the same effect can be achieved by reversing the type of contacts on either one side or both sides of the contact substrate. Also, in the above embodiment, the encoders of the outer and inner operating shafts were both contact type rotary encoders, but the same effect can be achieved by making either one or both optical rotary encoders and remain within the scope of this invention.

Industrial Applicability

As described above, since the means for attaching the rotary encoder to a device is provided either around the outside or in the bottom surface of the base member, it is not necessary to make the rotary encoder base member taller to accommodate the attachment means as in the prior art.

Further, the fitting and supporting portion of the operating shaft is not above the rotary encoder base member as in the prior art, but rather the cylindrical operating shaft is supported by the cylindrical support shaft extending up from the center of the bottom surface of the base member. Therefore the height of the outer wall of the rotary encoder base member can cover part of the fitting length of the operating shaft, thus making it possible to make the rotary encoder thinner. In addition to the above effects, this invention has the following effects in double-shaft rotary encoders:

(1) The base member is disposed at the bottom of the rotary encoder and the fixed contact substrate positioned above it. Since the inner operating shaft is supported directly by the cylindrical support shaft extending up from the bottom surface of the base member and the outer operating shaft is supported by the center round hole in the contact substrate, the often used inner operating shaft has only one fitting gap, resulting in that play in the radial direction (radial play) is minimized.

Also, since the inner and outer operating shafts are each supported by different means, even if the fitting gaps are made small in order to minimize radial play in the inner and outer operating shafts, the operating shafts will not turn together.

(2) Since the rotary contact plates of the inner and outer operating shafts are positioned above and below the fixed contact substrate, respectively, the outside diameter of the contact substrate can be made to match the size of each configuration of the contacts engaging with the rotary contact plates on the upper or lower surface thereof, and therefore it need not be made very large.

We claim:

1. A rotary encoder comprising: a base member having an outer flange; attachment means such as notches or holes in the outer flange or on the outside of the bottom surface of the base member and a cylindrical support shaft extending up from the center of the base member; a cylindrical operating shaft which is rotatably supported by said cylindrical support shaft on at least the bottom and top portions and has an attachment portion to a control knob on the outer circumference; a rotary plate attached to the lower end of said cylindrical operating shaft; and a substrate which is disposed on the bottom of the base member and has external connection terminals and a means for generating a pulse signal by engaging with said rotary plate.

2. A rotary encoder according to claim 1, wherein a rotary contact plate having movable contacts on its lower surface is attached to the lower end of the cylindrical operating shaft and a fixed contact substrate which engages with said movable contacts to generate pulse signals is positioned on the bottom of the base member.

3. A rotary encoder according to claim 1, wherein a circular reflective slit plate is attached to the lower end of the cylindrical operating shaft and am insulting substrate having a light emitting element and light receiving element is positioned on the bottom of the base member.

4. A rotary encoder comprising: a disc-shaped base member positioned at the bottom of said rotary encoder and having a cylindrical support shaft extending perpendicularly up from the center of said base member; a contact substrate supported by said base member; an inner operating shaft which is rotatably supported by said support shaft and supports an inner rotary contact plate on its lower end; an outer operating shaft which is positioned concentrically on the outside of the inner operating shaft and supports an outer rotary contact plate at the outside lower end thereof, said inner and outer operating shafts having rotary contacts; a contact plate which is fixed by the outer wall of the base member at a position between the outer and inner rotary contact plates and has fixed contacts on its upper and lower surfaces which engage with the rotary contacts of the outer and inner operating shafts, respectively, to generate switching signals.

5. A rotary encoder according to claim 4, wherein the outer operating shaft is rotatably supported by a round hole in the center of the contact substrate concentrically with the inner operating shaft, and the upper surface of the outer rotary contact plate of the outer operating shaft is held down by a cover so as not to rise up.

6. A rotary encoder according to claim 4, wherein the upward movement of the inner operating shaft is restricted by the bottom edge of the outer operating shaft holding down the inner rotary contact plate attached to the lower end of the inner operating shaft.

7. A rotary encoder according to claim 4, wherein the fixed contacts on the upper and lower surfaces of the contact substrate are flexible contacts protruding up and down from the upper and lower surfaces, respectively.

* * * * *